United States Patent [19]

Boy

[11] Patent Number: 4,797,778

[45] Date of Patent: Jan. 10, 1989

[54] GAS DISCHARGE PATH

[75] Inventor: Juergen Boy, Berlin, Fed. Rep. of Germany

[73] Assignee: Siemens Aktiengesellschaft, Berlin and Munich, Fed. Rep. of Germany

[21] Appl. No.: 58,874

[22] Filed: Jun. 5, 1987

[30] Foreign Application Priority Data

Jun. 18, 1986 [DE] Fed. Rep. of Germany ....... 3620344

[51] Int. Cl.[4] .......................... H02H 9/06; H01T 4/16

[52] U.S. Cl. .................................... 361/130; 361/129; 361/128; 361/120

[58] Field of Search ............... 361/120, 129, 130, 117, 361/126, 127, 128

[56] References Cited

U.S. PATENT DOCUMENTS

| | | | |
|---|---|---|---|
| 3,366,435 | 1/1968 | Lafferty | 316/24 |
| 3,399,147 | 8/1968 | Turner | 252/372 |
| 3,454,811 | 7/1969 | Scudner | 313/220 |
| 3,866,091 | 2/1975 | Kawiecki | 315/203 |
| 3,904,910 | 9/1975 | Schleimann-Jensen | 361/117 X |
| 4,293,887 | 10/1981 | Splitt et al. | 361/120 |
| 4,404,234 | 9/1983 | Zuk | 361/120 X |
| 4,407,849 | 10/1983 | Haas et al. | 361/120 |
| 4,491,893 | 1/1985 | Toda | 361/120 |
| 4,493,004 | 1/1985 | Lange et al. | 361/120 |
| 4,583,147 | 4/1986 | Boy et al. | 361/120 |

FOREIGN PATENT DOCUMENTS

| | | |
|---|---|---|
| 2354697 | 5/1974 | Fed. Rep. of Germany . |
| 2705885 | 8/1978 | Fed. Rep. of Germany . |
| 990361 | 8/1951 | France . |
| 1574780 | 7/1969 | France . |
| 1439775 | 6/1976 | United Kingdom . |

OTHER PUBLICATIONS

Avilov et al., "Pulsed Stable High-Pressure Spark Gap," Instruments and Experimental Techniques, vol. 16, 1973, pp. 162-164.

*Primary Examiner*—A. D. Pellinen

*Assistant Examiner*—H. L. Williams

*Attorney, Agent, or Firm*—Hill, Van Santen, Steadman & Simpson

[57] ABSTRACT

For switching high voltages, high frequencies and at high numbers of switching actuations, a gas discharge structure is provided which is composed of a series circuit of two or more individual arresters which comprise electrodes of copper and which are filled with gas which is at least partially composed of hydrogen. The gas discharge path is suitable for switching frequencies in the kHz range.

2 Claims, 1 Drawing Sheet

GAS DISCHARGE PATH

BACKGROUND OF THE INVENTION

1. Field of the Invention

The present invention relates to a gas discharge path suitable for high voltages, high frequencies and high numbers of switching actuations, and is more particularly concerned with a gas discharge path which comprises two or more series-connected individual arresters in which each individual arrester contains two electrodes which extend into two openings of an insulator tube and are connected to the insulator tube in a vacuum-type manner and comprise end faces lying opposite one another.

2. Description of the Prior Art

U.S. Pat. No. 3,866,091, fully incorporated herein by this reference, discloses an overvoltage arrester comprising the structure set forth above. Although such an overvoltage arrester has a short response time, it has a relatively long deionization time which does not allow the use of such an overvoltage arrester as a switch for high frequencies in the kHz range.

The British Patent No. 1,439,775, fully incorporated herein by this reference, discloses a gas-filled overvoltage arrester comprising copper electrodes and comprising a coating of bismuth, antimony, zinc or tin on at least a portion of the discharge surfaces. This arrangement is intended to increase the response rapidity. However, the aforementioned materials fundamentally do not allow an adequately short deionization time for utilization at frequencies in the kHz range.

SUMMARY OF THE INVENTION

In comparison thereto, the object of the present invention is to provide an increase in the obtainable number of switching actuations in that the low-ignition voltage of the discharge path is increased and the deionization time is simultaneously shortened. What is meant here by a high number of switching actuations is a number of switching actuations of more than one thousand actuations per second. A high frequency in the sense of the present invention is a frequency in the kHz range.

According to the invention, the above object is achieved in a device of the type set forth above in that the electrodes are composed of copper and in that the filling gas is at least partially composed of $H_2$.

The switching path is thereby composed of the series circuit of two or more individual arresters which comprise copper electrodes, a gas fill containing hydrogen and a suitable activation compound.

A filling gas which can be well handled during manufacture comprises hydrogen and argon, whereby the hydrogen constituent lies between 5% and 20%.

Sodium silicate is advantageously applied to the end faces of the electrodes as an activation compound. With such an embodiment, an ignition voltage of 1 kV and a glow discharge voltage greater than 150 V can be achieved for each individual arrester. For example, in a resonant circuit for igniting high-pressure gas discharge lamps, four thousand actuations per second can therefore be realized without having quenching failures influencing the operational reliability. Dependent on the plurality of individual arresters, the ignition voltage can be set, for example, to 7 kV through 8 kV.

BRIEF DESCRIPTION OF THE DRAWING

Other objects, features and advantages of the invention, its organization, construction and operation will be best understood from the following detailed description, taken in conjunction with the accompanying drawing, on which.

DESCRIPTION OF THE PREFERRED EMBODIMENTS

Figure 1:
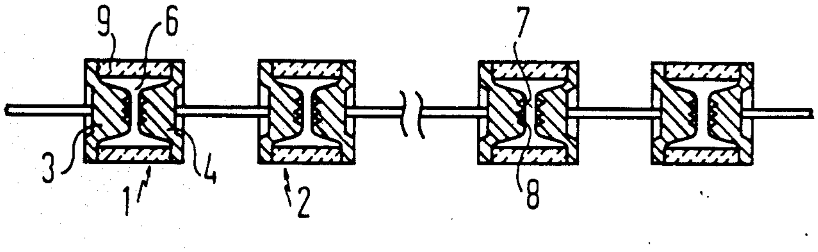
FIG. 1 is a longitudinal sectional view schematially illustrating a series connection of arresters in accordance with the present invention.

Referring to the drawing, in the structures illustrated, the electrodes, 3, 4 and 5 are composed of copper and a gas discharge gap 6 is filled with a filling gas containing hydrogen. A considerable reduction of the deionization time is achieved by this material selection. The end faces 7 of the electrodes 3, 4 and 5 are preferably each provided with an activation layer 8 of sodium silicate and a metal component, such as nickel. A relatively low arc maintaining voltage, in combination with an adequately high-glow maintaining voltage is thereby guaranteed, and an evaporation of electrode material, given current flow, is greatly reduced.

For example, a frequency of 4 kHz can be switched off with the described embodiment and an ignition voltage of 1 kV and a glow-maintaining voltage of 150 V per individual arrester, 1, 2 can thereby be achieved, so that the gas discharge paths (in FIGS. 1, 2) formed of n individual arresters respectively comprise an ignition voltage of $n \times 1$ kV and a glow maintaining voltage of $n \times 150$ V.

An advantageous application of the invention is in the ignition of high-voltage gas discharge lamps. An exemplary embodiment having a total of 8 individual arresters 1, 2 can be advantageously utilized in such an application. The switching problems usually occurring produce four thousand actuations per second and can be governed without problems with the gas discharge path of the present invention.

Figure 2:
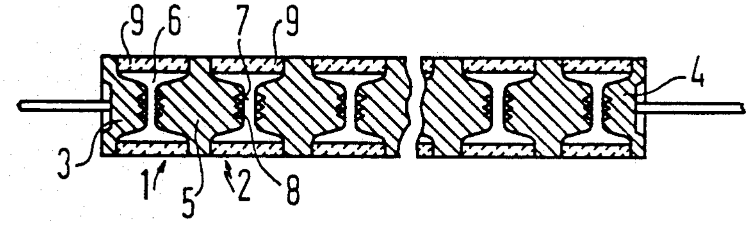
FIG. 2 is a longitudinal sectional view illustrating another embodiment of the invention.

The gas discharge path can be composed either of the series connection of discrete individual arresters (FIG. 1) or of a combined construction wherein the individual arresters are arranged axially relative to one another and electrodes adjacent to one another are soldered to one another or are composed of a single piece. In this last example, the electrodes 5 connected to one another of one piece are advantageously composed of solid material (FIG. 2). A higher thermal capacity is thereby achieved, this enabling a higher stability of the ignition voltage during operation. The mechanical stresses produced by temperature fluctuations are rendered harmless by the symmetrical structure of the electrodes and by the insulator tubes 9 at both sides given standard dimensionings. The insulator tubes 9 are thereby preferably composed of a ceramic material.

Although I have described my invention by reference to particular illustrative embodiments thereof, many changes and modifications of the invention may become apparent to those skilled in the art without departing from the spirit and scope of the invention. I thereby intend to include within the patent warranted hereon all such changes and modifications as may reasonably and properly be included within the scope of my contribution to the art.

I claim:

1. A gas discharge structure for high voltages, high frequencies and high numbers of switching actuations, comprising: at least two series-associated individual arresters; an insulator tube including two openings;

each of said arresters comprising two electrodes which extend into said tube openings of said insulator tube and are connected thereto in a vacuum-tight manner such that said insulator tube and said electrodes form an individual gas discharge gap;

a gas in said gas discharge gap which is partially composed of hydrogen with the hydrogen constituent lying between 5 vol. % and 10 vol. %;

said electrodes including end faces lying opposite one another and an activation compound carried on said end faces, said electrodes comprising solid copper and said electrodes which are adjacent to one another in the series being arranged on the same axis and being a one-piece structure.

2. The gas discharge structure of claim 1, wherein: said activation compound carried on said end faces of said electrodes comprises sodium silicate and nickel.

* * * * *